United States Patent [19]
Anderson et al.

[11] 3,733,784
[45] May 22, 1973

[54] ELECTRO-BAG DUST COLLECTOR

[75] Inventors: William M. Anderson; John R. Dervay, II, both of Wellsville, N.Y.

[73] Assignee: The Air Preheater Company, Inc., Wellsville, N.Y.

[22] Filed: Oct. 5, 1971

[21] Appl. No.: 186,743

[52] U.S. Cl. ..........................55/117, 55/138, 55/146, 55/148, 55/154, 55/302, 55/341, 55/379
[51] Int. Cl. ................................................B03c 3/80
[58] Field of Search..........................55/131, 136, 137, 55/138, 150, 151, 120, 146, 148, 154, 155, 341, 302, 124, 117, 379

[56] References Cited

UNITED STATES PATENTS

| | | |
|---|---|---|
| 2,759,877 | 8/1956 | Eron..................................208/161 X |
| 3,111,398 | 11/1963 | Jones......................................34/48 X |
| 3,370,646 | 2/1968 | Hopper....................................165/95 |
| 3,577,705 | 5/1971 | Sharlit................................55/131 X |

FOREIGN PATENTS OR APPLICATIONS

| | | | |
|---|---|---|---|
| 698,874 | 10/1953 | Great Britain...................55/DIG. 38 |

*Primary Examiner*—Dennis E. Talbert, Jr.
*Attorney*—Wayne H. Lang et al.

[57] ABSTRACT

A filter arrangement that first imposes an electrostatic charge upon all particulate matter carried by a stream of gas to be filtered. A charge of similar polarity is placed upon the filtering means whereby the particulate matter having a like charge is repelled therefrom to permit only the dust-free carrier gas to pass therethrough.

2 Claims, 1 Drawing Figure

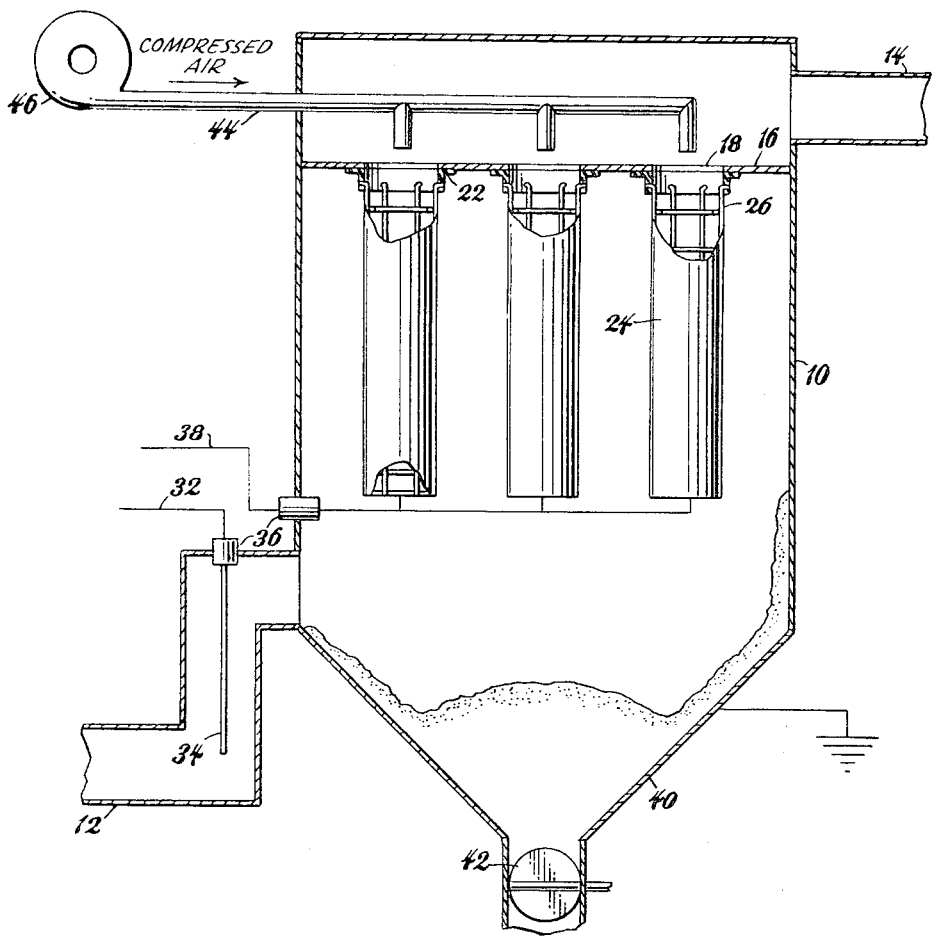

ELECTRO-BAG DUST COLLECTOR

BACKGROUND OF THE INVENTION

1. Field of the Invention

This invention relates to filtering device by which gas carrying a quantity of dust or other particulate matter is directed therethrough to strip the gas of the dust and thus provide a virtually dust-free exhaust. Dust collected by a filter builds up into a dense layer on the surface of the filter and thus increases the pressure difference required to pass the gas through the filter. In conventional filtering apparatus this dust must be periodically dislodged to provide a porous filter medium that continuously presents a virtually clean surface to the flowing gas so that it may easily pass therethrough.

2. Description of Prior Art

It is known that solids filtered from a carrier gas collected upon the surface of a filter and eventually foul the filtering medium to the extent that the solids must be periodically removed to present a clean filter surface to the flowing gas so that the gas may flow therethrough with little pressure loss due to the resistance of the collected solids.

To this end, various arrangements have been devised whereby the filtering medium may be shaken or rapped, subjected to reversely flowing air streams, sonic waves or otherwise subjected to a form of agitation that will remove collected dust particles therefrom.

Accordingly, various patents have been granted to apparatus of the type represented by U. S. Pat. Nos. 2,854,091 and 2,932,362 whereby a cleaning force was produced sufficient to agitate the dust relative to the surface of the filter so as to break the bonds by which said dust was clinging thereto. Upon breaking away from the surface of the filter the dust would fall by gravity to the surrounding hopper where it would be collected for carrying away from the system and ultimate disposal.

SUMMARY OF THE INVENTION

It has been found that such means are only partially effective because the heavy agglomerated particles are removed from the filter medium while the more solitary, light particles cling to the filter, only to be removed therefrom after they too agglomerate with other particles to form a suitably heavier mass. Moreover, an electrostatic phenomenon present in all mechanical filtering apparatus presents an additional force by which some of the collected dust particles are held to the filter medium by the force of electrostatic attraction and thus continuously persist in clinging to the filtering medium despite various efforts to dislodge them.

It is known that dust particles carried by a carrier gas stream will become charged electrostatically, both positively and negatively, due to friction with the air or other carrier gas. Moreover, the filter itself may also become charged by frictional contact with the same carrier gas. Thus, most of the dust particles and the filter itself are charged with electrostatic charges of the same or of different polarity so that some dust particles will continuously cling to the filter medium because of the electrostatic attraction of media having unlike charges.

This invention utilizes this basic phenomonon and provides for a filterhouse arrangement by which all the particulate matter in a gas stream and the filter itself are simultaneously subjected to an electrostatic charge of like polarity so that the electrostatic forces of repulsion are utilized to repel particulate matter from the filter medium whereby only the dust-free carrier gas is allowed to pass therethrough and to be exhausted from the filterhouse.

BRIEF DESCRIPTION OF THE DRAWING

The single FIGURE is a side elevation of a bag filter showing an arrangement according to this invention.

DESCRIPTION OF THE PREFERRED EMBODIMENT

The apparatus according to this invention comprises a housing 10 having an inlet 12 for a dust bearing gas and an outlet 14 for the exhaust of clean gas therefrom. The housing is separated into inlet and outlet portions by a tube sheet 16 having a series of ports 18 therein. The ports are surrounded by an annular insulating collar 22 from which depend filters 24 of customary form. A skeletal metallic cage or support 26 inside each bag filter is clamped to the insulating collar 22 to support the bag in its cylindrical form and prevent excess outside pressure from collapsing the bag and thereby reducing its effectiveness.

In apparatus of the type commonly used, dust bearing gas is introduced to the filter housing so that the dust collects on the surface of the filter in such a manner that only the clean air or other gas is permitted to pass therethrough. After building up substantial deposits on the surface of the filter medium, the dust is periodically removed by one of the previously discussed forms of cleaning action.

In accordance with this invention, there is additionally provided an arrangement by which a large portion of the particulate matter carried in the gas stream is removed therefrom in advance of the filter so that only substantially dust-free gas is directed therethrough. Dust collecting on the surface of the filter is thus reduced to a minimum and the pressure loss to gas passing therethrough due to resistance of deposits is reduced to a minimum.

A source of high voltage 32 is connected to a discharge electrode 34 that is supported by insulator 36 in the inlet 12 for dust laden gas. An electric field provided by a source 38 and having a like charge is placed upon the cage support 26 for the filter bags, while the hopper 40 at the bottom of the housing 10 for the filter bags is connected to a suitable ground connection so that the charged particles will be attracted thereto.

While the discharge electrode 34 may provide a weak attraction for those dust particles having an unlike charge, the fluid stream carrying them will sweep them past the electrode toward the filter. However in passing through the electrostatic discharge of the electrode 34, the dust particles will be imparted the same charge as the filter medium and opposite to that imparted to the filter housing. Thus the dust particles are attracted to the housing and collect on said housing and the housing floor.

A suitable clean-out door 42 at the bottom of the hopper permits the removal therethrough of dust that has been separated from the carrier gas.

In practice, a small portion of the particulate matter entrained in the carrier gas is not sufficiently ionized by the discharge electrode 34 or it is so fine and of insufficient mass to be repelled by the similarly charged filter and attracted to the grounded housing 38, but is carried along in the gas stream and subsequently deposited on the surface of the filter. To prevent the buildup of such matter on the surface of the bag filter, conventional cleaning means such as is indicated by air supply duct 44 having nozzles 46 exhausting into the open end of the filter bag are usually installed to periodically exhaust a blast of compressed air from source 46 into the open end of the bag filters 24 to dislodge the collected dust particles. Although such auxiliary cleaning means 46 are preferably installed and readily available, they are infrequently used and the use of compressed cleaning air is reduced to a minimum.

This and various other chamges may be made in the device without departing from the spirit of the invention. It is accordingly intended that all matter contained in the above description or shown in the accompanying drawing shall be interpreted as illustrative and not in a limiting sense.

I claim:

1. Filter apparatus that comprises a filter housing enclosing a filter compartment having an inlet for gas to be filtered and an outlet for the exhaust of clean gas therefrom, a perforated tube sheet intermediate the inlet and outlet, insulating means surrounding each perforation of said tube sheet, a metallic cage for a bag filter depending from each insulating means, a filter element surrounding each metallic cage, means for imposing an electric field on each cage and its surrounding filter, a discharge electrode in advance of said inlet for subjecting particulate matter carried by the gas to be filtered to an electrostatic charge having a polarity similar to that placed upon each cage and its surrounding filter, and means comprising a ground connection secured to said filter housing whereby particulate matter carried in said gas stream is first charged by the electrostatic discharge from said electrode and then repelled by the similarly charged filter before being deposited in the housing.

2. A filter apparatus as defined in claim 1 having an auxiliary cleaning mechanism that removes particulate matter that collects on the surface of the filter element.

* * * * *